March 31, 1931.  M. STEIGEL  1,799,030
VEHICLE SIGNAL
Filed April 28, 1930  2 Sheets-Sheet 1
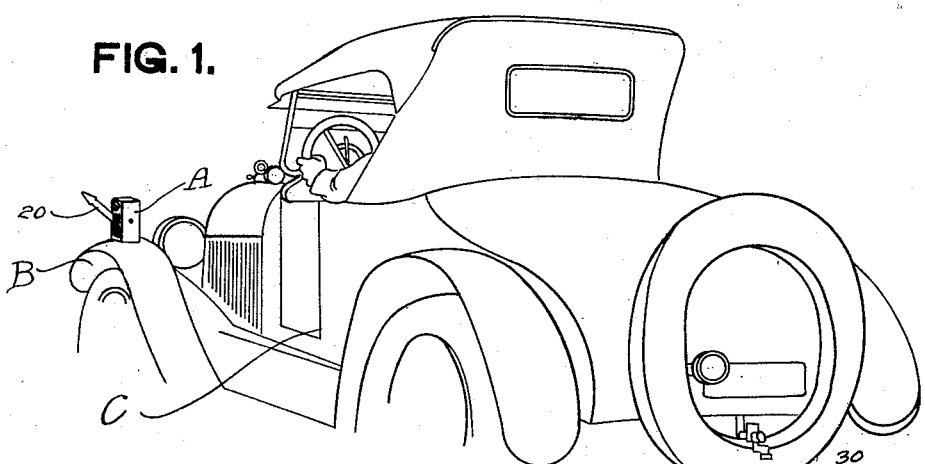
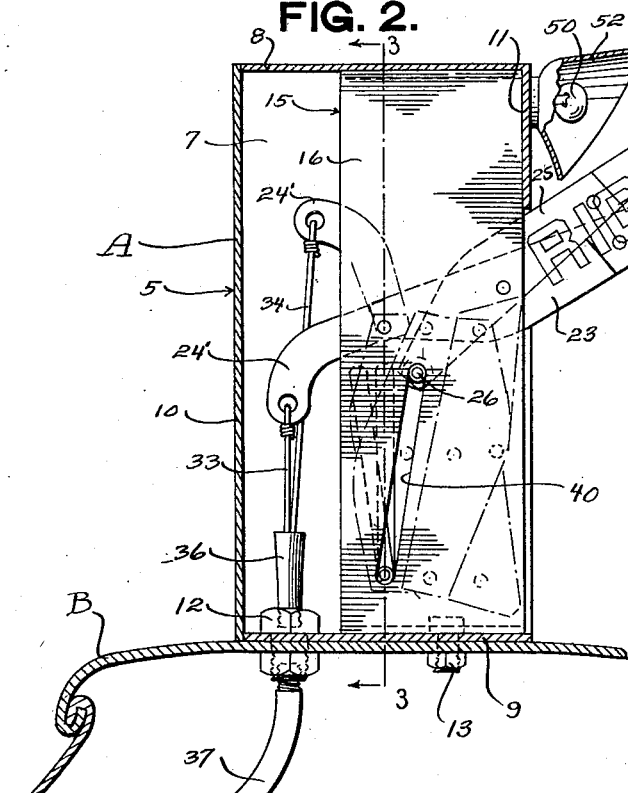
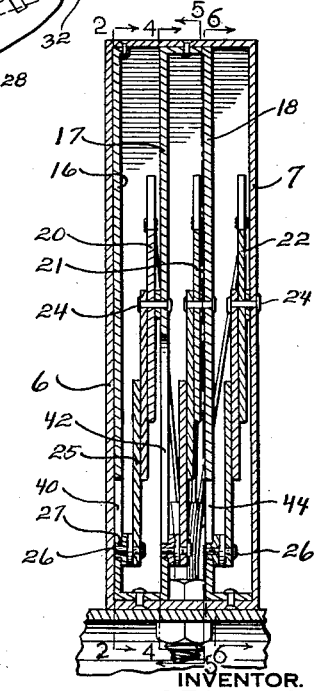
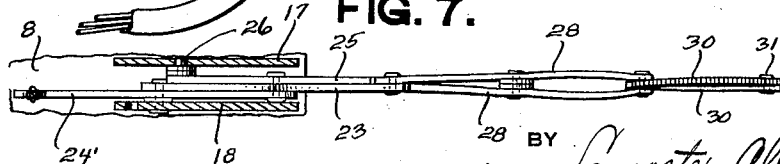
INVENTOR.
M. Steigel
BY Lancaster, Allwine & Rommel
ATTORNEYS.

March 31, 1931.    M. STEIGEL    1,799,030
VEHICLE SIGNAL
Filed April 28, 1930    2 Sheets-Sheet 2
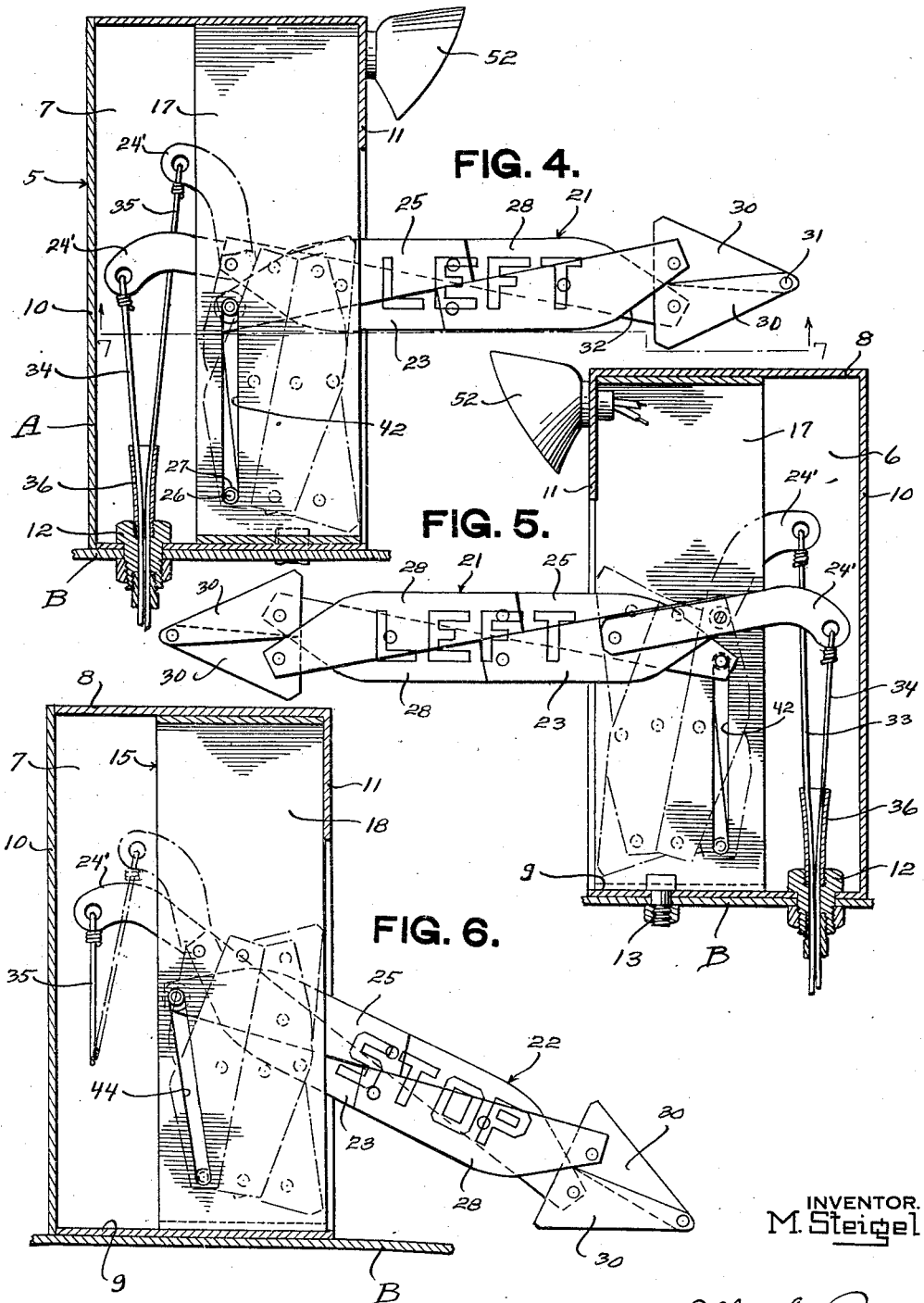

Patented Mar. 31, 1931

1,799,030

UNITED STATES PATENT OFFICE

MIKE STEIGEL, OF BUENA PARK, CALIFORNIA

VEHICLE SIGNAL

Application filed April 28, 1930. Serial No. 448,033.

The present invention relates to improvements in vehicle signals and more particularly to a vehicle direction signal for indicating the course to be taken by the vehicle.

The primary object of the invention is to provide a vehicle direction signal embodying independently operable signal or indicating arms each of which is intended to be extended into a different position for signalling both forwardly and rearwardly of the vehicle the intended course to be taken by the vehicle.

A further object of the invention resides in the novel construction of the indicator or signal arms which when extended will form an arrow and when folded will be of a compact form for concealment within a relatively small casing or housing.

A further object resides in the novel and simple arrangement whereby the signals are extended in different directions.

Other objects and advantages of the invention will be apparent during the course of the following detailed description, taken in connection with the accompanying drawings forming a part of this specification and in which drawings:

Figure 1 is a perspective view of a motor vehicle showing the improved signal applied thereto.

Figure 2 is a vertical section on the line 2—2 of Figure 3 but showing one of the signal or indicator arms extended.

Figure 3 is a vertical section on the line 3—3 of Figure 2 and showing the three indicators in a collapsed or retracted position.

Figures 4, 5 and 6 are sections on the respective lines in Figure 3 but showing the indicator arms extended.

Figure 7 is a fragmentary section substantially on the line 7—7 of Figure 4.

In the drawings, and wherein similar reference characters designate corresponding parts thruout the several views, the letter A designates the improved vehicle direction signal shown mounted upon the front left fender B of a motor vehicle C.

The signal comprises a substantially rectangular-shaped casing or housing 5 embodying front and rear walls 6 and 7 respectively, top and bottom walls 8 and 9, an inner wall 10, and an outer wall 11 which as will be observed in Figures 2, 4 and 6 extends for only a short distance downwardly from the top wall 8 leaving the major portion of the outer side of the casing open. The casing 5 may be of any other suitable shape and may be mounted at any suitable location upon the vehicle and not necessarily upon the left front vehicle center as shown. The casing may be mounted in a vertical position upon the fender by means of a bushing 12 and a mounting bolt 13 extended thru the casing bottom wall 9 preferably midway between the front and rear walls 6 and 7 with the hollow bushing 12 disposed adjacent the inner side wall 10. The bushing 12 aside from serving for mounting of the casing also permits passage of control cables into the casing for actuation of the indicator arms. The inner wall 12 may be made removable for permitting easy assembling of the signal apparatus within the casing.

Mounted within the forward portion of the casing 5 is a compartment forming member 15 which is preferably made from a single strip of sheet metal bent to form three parallel spaced apart plates 16, 17 and 18, the plates 17 and 18 forming vertically extending partition plates and forming three separate compartments opening at the outer side of the casing below the outer wall portion 11. This compartment forming member 15 may be secured at its ends as by means of rivets or the like to the top and bottom walls of the casing and is arranged with the plate 16 in surface contact with the inner side of the front casing wall 6. The plates 16, 17 and 18 are of less width than the width of the casing whereby an open space is formed between the inner edges of the plates and the inner casing wall 10.

The casing 5 is intended to have mounted therein three independently operable signal arms or indicators 20, 21 and 22 for indicating right, left and stop signals respectively. These indicators 20, 21 and 22 are of lazy tong construction and are intended to be mounted one within each of the independent compartments formed by the member 15.

The folding or collapsible indicators 20, 21 and 22 are of like construction and each embodies a series of cross connected levers of lazy tong construction. The inner lever 23 of each indicator is pivotally mounted on a fixed pivot pin 24 and these pivot pins are arranged in axial alignment as shown in Figure 3, two of the pivot pins being mounted one in each of the partition plates 17 and 18 and one in the rear casing wall 7. Secured to each lever 23 is an extension or lever arm 24' and these arms extend inwardly beyond the inner edge of the compartment forming member 15. The inner lever 25 forming a companion lever for the inner lever 23 of each indicator is provided at its inner end with a guide pin 26 and on which is preferably mounted a shouldered roller 27. The outer pair of cross connected levers 28 each has pivotally connected to its outer end a head section 30 and these sections 30 are in the form of a right triangle, and are pivotally connected at the outer ends by a suitable pivot pin 31. The outer end of each lever 28 preferably has one of its edges beveled as at 32.

The indicators 20, 21 and 22 are independently operable by means of Bowden wires 33, 34 and 35 respectively attached to the apertured ends of the extension arms 24 of the indicators. The bushing 12 is provided at its inner end with a guide bell 36 for guiding the Bowden wires thru the bushing and into the casing 37. The Bowden wires may be led from beneath the fender to a location whereby the operator of the vehicle may readily impart operation to the desired indicator. When a pull is exerted upon one of the Bowden wires, the extension arm 24' to which the wire is connected will be drawn downwardly and the indicator extended.

The indicators 20, 21 and 22 may be colored in any suitable manner desired and with the indicator 20 having delineated on each side of the stem portion of the arrow the word "Right" for indicating a right hand turn. The indicator 21 preferably has delineated on each side the word "Left", while the indicator 22 has delineated on each side thereof the word "Stop". The lettering upon the indicators as will be observed is formed part on each of the cross connected levers forming the stem portion of the arrow. For more clearly indicating the intentions of the driver of the vehicle, a novel arrangement is provided whereby the indicator 20 for signalling "right" extends upwardly at an angle from the casing 5, the indicator 21 for signalling "left" is extended in a horizontal direction from the casing, and the indicator 22 for signalling "stop" extends downwardly at an angle from the casing as shown in Figures 2, 4 and 6 respectively. The different angular positions of the indicators when extended will indicate the intended course without necessarily requiring that the person be able to read the lettering upon the indicators.

Referring first to the manner of extending the right indicator 20 in an upward direction from the casing, the plate 16 is provided in its lower portion with an angular guide slot 40 in which the guide roller 27 of the indicator has movement. This guide slot 40 is inclined upwardly and outwardly with its lower end preferably in vertical alignment beneath the fixed pivot point 24 for the indicator. Thus it will be seen that when the indicator 20 is extended that the movable pivot 26 will move from a position beneath the fixed pivot 24 and cause the extended arrow to project upwardly.

The indicator 21 for signalling a left turn is projected in a horizontal position thru the provision of a perfectly vertical guide slot 42 formed in the partition plate 17 in vertical alignment beneath the fixed pivot point 24 for the indicator. The guide roller 27 of the indicator 21 has vertical movement in the straight guide slot 42 and moves in a perfectly vertical position.

The indicator 22 for signalling "stop" is extended from the casing in a downwardly inclined position by means of an angular guide slot 44 provided in the partition plate 18. This angular guide slot 44 has its lower end arranged vertically beneath the fixed pivot 24 for the indicator and is inclined upwardly and inwardly in an opposite direction to that of the inclination of the angular guide slot 40. The guide roller 27 of this indicator 22 has movement in the guide slot 44 in a manner whereby the indicator when extended will project downwardly as shown in Figure 6.

Thus it will be seen that the indicators are extended in different angular positions from the casing by means of the special arrangement of guide slots. The novel slot arrangement also allows for each of the indicators to be of like construction.

With the special formation of the levers 23, 25 and 28 and the formation of the head sections 30 it will be seen that when the indicator is extended that a true arrow is formed, the stem portion of which is formed by the levers 23, 25 and 28 and the tip or head of which is formed by the triangular-shaped sections 30. When the indicator is folded or collapsed thru an upward movement on the extension arms 24' by the Bowden wires, the indicator is collapsed into a small compact condition such as will permit of the casing or housing 5 being made relatively small. The outer end portions of the outer levers 28 may be slightly bowed as shown in Figure 7 for accommodating the pivot pin 31 connecting the outer ends of the head forming sections 30 when the indicators are collapsed in the casing and this permits of more compact folding of the indicators.

The indicators may be illuminated at night time by means of an electric lamp 50 arranged in a suitable reflector 52 secured to the outer casing wall 11. This hood or reflector 52 is of such shape as to direct the light rays downwardly upon the indicators when extended. The lamp 50 may be illuminated in any desired manner.

The indicators will all assume a like position when folded in the casing owing to the axial alignment of the fixed pivots 24 and alignment of the lower ends of the guide slots 40, 42 and 44.

From the foregoing description it will be apparent that a novel vehicle direction signal has been disclosed embodying indicators of the lazy tong construction which when extended will form an arrow and when collapsed will fold into a compact condition for concealment within a relatively small housing. It will also be apparent that a simple arrangement has been disclosed whereby the individually operable indicators may be extended so as to project in different positions from the casing.

The indicators may embody any desired number of cross connected levers for increasing the length of the arrow and it will also be apparent that the casing may be provided with one or any desired number of the indicators.

Changes in detail may be made to the form of invention herein shown and described, without departing from the spirit of the invention or the scope of the following claims.

I claim:

1. In a vehicle signal, an open sided casing, an indicator embodying inner and outer cross connected levers, a fixed pivot for the inner end of one of the inner levers, a movable pivot for the inner end of the companion inner lever, pivotally connected head forming sections pivotally connected with the outer levers, and means for collapsing the indicator in the casing and extending the same therefrom, said cross connected levers when the indicator is extended providing a closed stem portion of an arrow.

2. In a vehicle signal a pair of parallel spaced apart supporting plates, an indicator of lazy tong construction embodying a pair of cross connected inner levers, a fixed pivot pivotally mounting one of the levers upon one of the plates, the companion plate being provided with a guide slot, a guide roller carried by the companion lever and guided in said slot, and means for collapsing the indicator into a position between the plates or extending the indicator from between the plates.

3. In a vehicle signal, a pair of vertical, parallel spaced apart plates, one of said plates being provided with a vertically disposed guide slot, an indicator of lazy tong construction embodying an inner pair of cross connected levers, a guide roller carried by one of the levers for movement in said guide slot, means pivotally connecting the companion lever to the opposite plate at a location above the upper end of the vertical guide slot, said last mentioned lever being provided with an extension arm, and means connected to the arm for collapsing and extending the indicator.

4. In a vehicle signal, a pair of vertically disposed parallel spaced apart plates, one of said plates being provided with a guide slot inclined to the vertical, an indicator of lazy tong construction including a pair of cross connected levers, means pivotally connecting one of the levers to the non-slotted plate at a location in vertical alignment above the lower end of the inclined slot, a guide roller carried by the companion lever for guided movement in the slot, and means connected with the lever having the fixed pivot for collapsing the indicator and also extending the same in a position inclined to the horizontal.

5. In a vehicle signal a casing, independently operable indicators of like lazy tong construction collapsible into like compact form in side by side relation in the casing and extensible into like arrow-like form when projected from the casing, an actuating means for each indicator, and means whereby the indicators are each projected in different angular positions from the casing.

6. In a vehicle signal a casing provided with independent compartments opening at one side of the casing, an indicator of lazy tong construction mounted in each compartment, actuating means for each indicator for selectively extending the indicators from the casing, and means associated with each indicator whereby the indicators are extended into different angular positions from the casing.

7. In a vehicle signal a casing, a compartment forming member in the casing embodying parallel spaced apart plates each being provided with a guide slot, said guide slots being in angular relation to one another, an indicator of lazy tong construction arranged in each compartment each embodying a pair of inner levers one having a fixed pivot and the other a movable pivot guided in one of the guide slots, and means for selectively actuating the indicators.

8. In a vehicle signal a casing, a compartment forming member in the casing embodying parallel spaced apart plates providing independent compartments, said plates each being provided with a guide slot, the guide slots aligning at their lower ends and extending upwardly in angular relation to one another, an indicator of lazy tong construction arranged in each compartment, each embodying an inner lever having a fixed pivot and an inner lever having a guide roller guided in the guide slot, and means connected with the levers having the fixed pivot for selectively actuating the indicators.

9. In a vehicle signal, an indicator of lazy tong construction comprising inner and outer pairs of cross connected levers with the outer pair of levers having one edge beveled, said cross connected levers being shaped to form a closed stem portion of an arrow having parallel edges when the indicator is extended, and a pair of head sections in the form of right triangles, pivotally connected together at one end and having their opposite ends pivotally connected one to each of the outer cross connected levers, said sections forming an arrow head when the indicator is extended.

MIKE STEIGEL.